(12) United States Patent
Kondo et al.

(10) Patent No.: US 10,397,041 B2
(45) Date of Patent: Aug. 27, 2019

(54) ELECTRONIC CONTROL UNIT

(71) Applicant: DENSO CORPORATION, Kariya, Aichi-pref. (JP)

(72) Inventors: Masayoshi Kondo, Kariya (JP); Satoshi Kanamaru, Kariya (JP)

(73) Assignee: DENSO CORPORATION, Kariya (JP)

( * ) Notice: Subject to any disclaimer, the term of this patent is extended or adjusted under 35 U.S.C. 154(b) by 105 days.

(21) Appl. No.: 15/662,982

(22) Filed: Jul. 28, 2017

(65) Prior Publication Data

US 2018/0077002 A1   Mar. 15, 2018

(30) Foreign Application Priority Data

Sep. 9, 2016  (JP) ................................. 2016-176694
Jul. 11, 2017  (JP) ................................. 2017-135436

(51) Int. Cl.
| | |
|---|---|
| H04L 1/00 | (2006.01) |
| H04L 12/40 | (2006.01) |
| H04L 29/06 | (2006.01) |
| H04L 29/08 | (2006.01) |
| B60R 16/023 | (2006.01) |

(52) U.S. Cl.
CPC ...... *H04L 29/08135* (2013.01); *B60R 16/023* (2013.01); *H04L 1/0007* (2013.01); *H04L 1/0083* (2013.01); *H04L 12/40* (2013.01); *H04L 29/0602* (2013.01); *H04L 69/324* (2013.01); *H04L 2001/0094* (2013.01)

(58) Field of Classification Search
None
See application file for complete search history.

(56) References Cited

U.S. PATENT DOCUMENTS

| | | | |
|---|---|---|---|
| 2007/0091932 A1* | 4/2007 | Hwang | H04L 12/4135 370/475 |
| 2011/0007897 A1* | 1/2011 | Kodama | H04L 12/40006 380/255 |
| 2015/0350176 A1* | 12/2015 | Mabuchi | H04L 9/3271 726/6 |
| 2017/0099606 A1* | 4/2017 | Chang | H04W 28/22 |

FOREIGN PATENT DOCUMENTS

| | | |
|---|---|---|
| JP | 2003-264567 A | 9/2003 |
| JP | 2012-204932 A | 10/2012 |

* cited by examiner

*Primary Examiner* — Alpus Hsu
*Assistant Examiner* — Camquyen Thai
(74) *Attorney, Agent, or Firm* — Posz Law Group, PLC

(57) ABSTRACT

An electronic control unit provides a transmission node in a communication system in which the transmission node stores first data in a transmission frame having a predetermined format and transmits the first data to a network, and a reception node receives the first data as a reception frame via the network. The electronic control unit includes: an allocation unit that divides second data into a plurality of split data items, and allocates the split data items to an empty area of the transmission frame other than an area where the first data is allocated; and a transmission unit that transmits the spilt data items allocated by the allocation unit and the first data as the transmission frame.

12 Claims, 17 Drawing Sheets

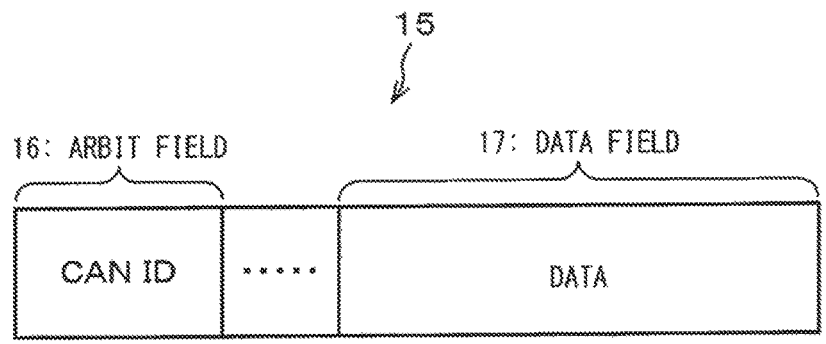

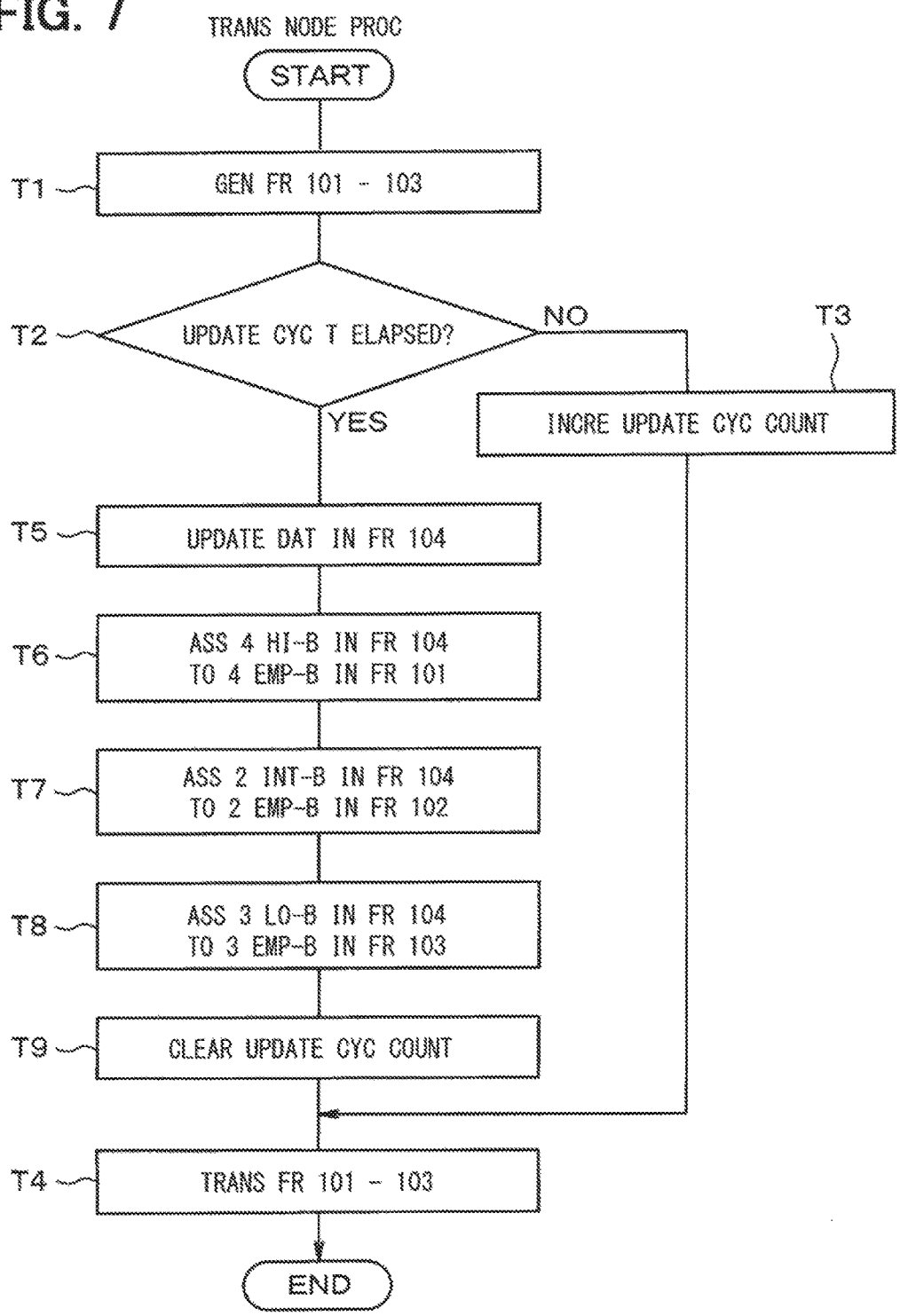

FIG. 10

| REST DATA αZ | bit8 | 7 | 6 | 5 | 4 | 3 | 2 | 1 | 0 |
|---|---|---|---|---|---|---|---|---|---|
| | 0 | 1 | 1 | 1 | 0 | 1 | 0 | 0 | 1 |

FIG. 11

| FRAME | bit3 | 2 | 1 | 0 |
|---|---|---|---|---|
| 203(4bit data):α | 1 | 1 | 0 | 1 |

FIG. 13

| REST DATA | bit3 | 2 | 1 | 0 |
|---|---|---|---|---|
| αZ | 1 | 1 | 0 | 1 |

| FRAME | bit7 | 6 | 5 | 4 | 3 | 2 | 1 | 0 |
|---|---|---|---|---|---|---|---|---|
| 301 | AVAIL | AVAIL | AVAIL | AVAIL | Serial No. | Serial No. | ↓ | ↓ |
|  |  |  |  |  | 0 | 0 | β2 | β1 |
|  |  |  |  |  | 0 | 1 | EMPTY | β0 |

FIG. 15

| FRAME | bit2 | 1 | 0 |
|---|---|---|---|
| 302(3bit data):β | 1 | 0 | 1 |

FIG. 19

| FRAME | bit2 | 1 | 0 |
|---|---|---|---|
| REST DATA $\beta Z$ | 1 | 0 | 1 |

FIG. 20

| FRAME | bit2 | 1 | 0 |
|---|---|---|---|
| 405(3bit data) : $\alpha$ | 0 | 0 | 1 |

| FRAME | bit6 | 5 | 4 | 3 | 2 | 1 | 0 |
|---|---|---|---|---|---|---|---|
| 406(7bit data) : $\beta$ | 1 | 1 | 0 | 1 | 0 | 0 | 1 |

| FRAME | bit7 | 6 | 5 | 4 | 3 | 2 | 1 | 0 |
|---|---|---|---|---|---|---|---|---|
| 401 | AVAIL | AVAIL | AVAIL | AVAIL | $\alpha 2$ | $\alpha 1$ | EMPTY | $\beta 0$ |
| 402 | AVAIL | AVAIL | AVAIL | AVAIL | AVAIL | AVAIL | $\alpha 0$ | $\beta 1$ |
| 403 | AVAIL | AVAIL | EMPTY | $\beta 3$ | $\beta 2$ | AVAIL | AVAIL | AVAIL |
| 404 | AVAIL | $\beta 4$ | $\beta 5$ | $\beta 6$ | AVAIL | AVAIL | AVAIL | AVAIL |

FIG. 25

| FRAME | bit2 | 1 | 0 |
|---|---|---|---|
| REST DAT $\alpha Z$ OF 405 | 0 | 0 | 1 |

| FRAME | bit6 | 5 | 4 | 3 | 2 | 1 | 0 |
|---|---|---|---|---|---|---|---|
| REST DAT $\beta Z$ OF 406 | 1 | 1 | 0 | 1 | 0 | 0 | 1 |

ELECTRONIC CONTROL UNIT

CROSS REFERENCE TO RELATED APPLICATIONS

This application is based on Japanese Patent Applications No. 2016-176694 filed on Sep. 9, 2016, and No. 2017-135436 filed on Jul. 11, 2017, the disclosures of which are incorporated herein by reference.

TECHNICAL FIELD

The present disclosure relates to an electronic control unit.

BACKGROUND

For example, CAN (Controller Area Network, registered trademark) is provided as an in-vehicle network used for various parts such as power train or body systems in a vehicle and connects a plurality of electronic control units via a bus so as to enable communication with each other (e.g., see Patent Literature 1). This Patent Literature 1 describes a basic process based on the CAN communication method that can synchronize data communication between specific nodes out of a plurality of nodes.

As described in Patent Literature 1, the use of a CAN communication process may cause an empty area in a CAN data frame. A recent tendency is to increase the quantity of data to be transmitted and received between a plurality of nodes and increase a bus load. There is an increasing demand for constructing a communicate system capable of reducing a bus load.

Patent Literature 1: JP 2003-264567A

SUMMARY

It is an object of the present disclosure to provide an electronic control unit configuring a communication system that can reduce a bus load.

According to a first aspect of the present disclosure, an electronic control unit provides a transmission node in a communication system in which the transmission node stores first data in a transmission frame having a predetermined format and transmits the first data to a network, and a reception node receives the first data as a reception frame via the network. The electronic control unit includes: an allocation unit that divides second data into a plurality of spilt data items, and allocates the split data items to an empty area of the transmission frame other than an area where the first data is allocated; and a transmission unit that transmits the split data items allocated by the allocation unit and the first data as the transmission frame.

The allocation unit separately allocates the other second data to an empty area except an area to which the first data is allocated, permitting the use of an empty area in the previously formatted area. The empty area can therefore be used effectively. The second data need not be transmitted as an additional transmission frame. A bus load can be reduced.

According to a second aspect of the present disclosure, an electronic control unit provides a reception node in a communication system in which a transmission node stores first data in a transmission frame having a predetermined format and transmits the first data to a network, and the reception node receives the first data as a reception frame via the network. The transmission node includes: an allocation unit that divides second data into a plurality of split data items, and allocates the split data items to an empty area of the transmission frame other than an area where first data is allocated; and a transmission unit that transmits the split data items allocated by the allocation unit and first data as the transmission frame. The electronic control unit includes: an identification unit that distinguishes the first data from the spilt data items of the second data in the reception frame; and a restoration unit that generates restoration data from the split data items based on allocation destination information.

According to the above electronic control unit, an identification unit distinguishes the first data from spilt data items in the second data out of the reception frame and generates restoration data from the split data items based on allocation destination information. Data can be thereby restored.

BRIEF DESCRIPTION OF THE DRAWINGS

The above am otter objects, features and advantages of the present disclosure will become more apparent from the following detailed description made with reference to the accompanying drawings. In the drawings:

FIG. 4 is a diagram partially illustrating a communication data format for a data frame used for CAN;

FIG. 5 is a diagram illustrating the contents of a management table;

FIG. 6 illustrates other data example;

FIG. 7 is a flowchart schematically illustrating a process for the transmission node;

FIG. 10 is a diagram illustrating a result of data restoration;

FIG. 11 illustrates other data example according to a second embodiment;

FIG. 13 is a diagram illustrating a result of data restoration;

FIG. 14 is a diagram illustrating the contents of a management table according to a third embodiment;

FIG. 15 illustrates still other data example;

FIG. 19 is a diagram illustrating a result of data restoration;

FIG. 20 illustrates yet other data example;

FIG. 21 is a diagram illustrating the contents of a management table;

FIG. 25 is a diagram illustrating a result of data restoration.

DETAILED DESCRIPTION

Figure 1:
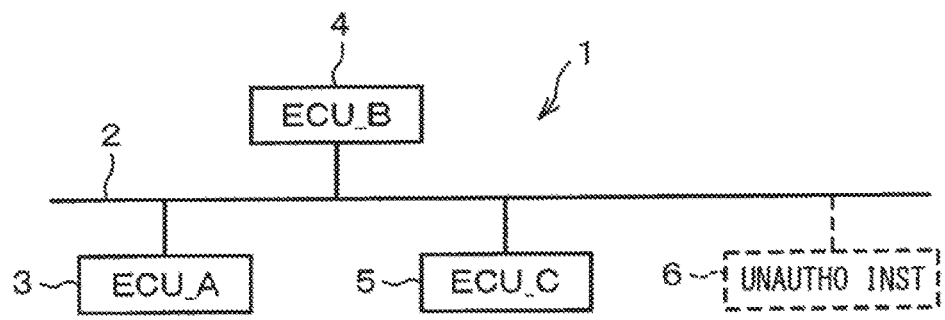
FIG. 1 is a configuration example of a communication system according to a first embodiment.

FIGS. 1 through 10 are explanatory diagrams according to the first embodiment. FIG. 1 illustrates a configuration example of a communication system 1. An in-vehicle network (hereinafter abbreviated to as a network) 2 uses the CAN (Controller Area Network, registered trademark) protocol, for example. CAN provides a closed in-vehicle network that uses a communication protocol used for data transmission between mutually connected instruments. The network 2 connects with various electronic control units (ECUs: Electronic Control Units) namely ECU_A3, ECU_B4, and ECU_C5 (hereinafter abbreviated to as ECUs 3, 4, and 5). The ECUs 3 through 5 are connected to the network 2 and can communicate with each other. Many ECUs such as the ECUs 3 through 5 operate in concert with the other ECUs to perform various controls in a vehicle. A malicious third party is supposed to illegally connect an instrument to the network 2. An unauthorized instrument 6 is illustrated with a broken line in FIG. 1.

Figure 2:
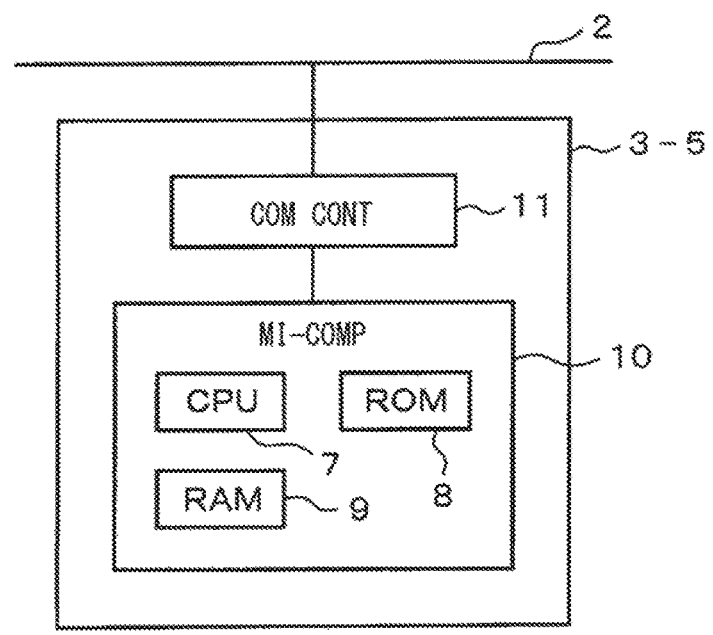
FIG. 2 is a an electric configuration diagram of an electronic control unit.

As illustrated in FIG. 2, the ECUs 3 through 5 each include a microcomputer 10 and a CAN-based communication controller 11. The microcomputer 10 includes a CPU 7, ROM 8, RAM 9 and the other memory modules (e.g., backup RAM and EEPROM, unshown). The description below uses a generic term "memory" to explain ROM 8, RAM 9 and the other memory modules (e.g., backup RAM and EEPROM). The communication controller 11 provides CAN-based communication connection to the network 2, for example. The microcomputer 10 of the ECU (such as ECU 3) connects with the communication controller 11 to provide communication connection to another ECU (such as ECU 4 or 5) that is connected to the network 2.

Figure 3A:
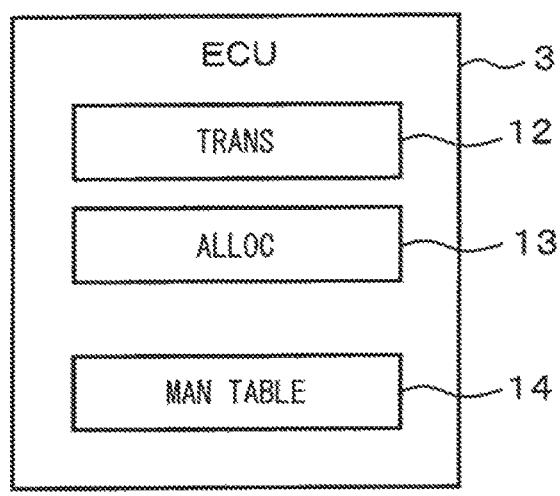
FIG. 3A is a diagram functionally illustrating an electric configuration of an electronic control unit as a transmission node.
Figure 3B:
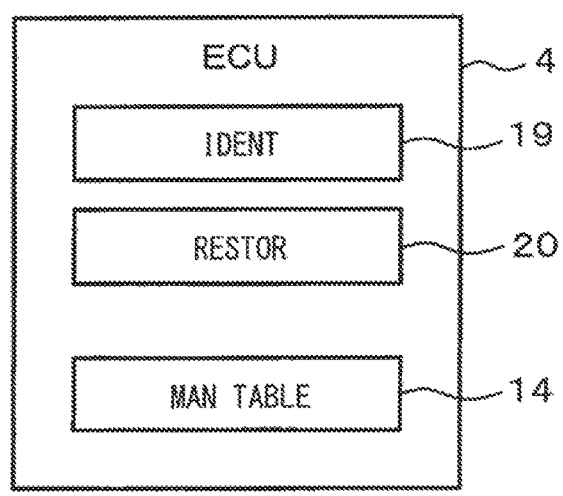
FIG. 3B is a diagram functionally illustrating an electric configuration of an electronic control unit as a reception node.

FIG. 3A functionally illustrates the ECU 3 regarded as a transmission node. The CPU 7 performs a program stored in the memory to provide functions as a transmission unit 12 and an allocation unit 13. The memory includes a storage area for a CAN-formatted management table 14. FIG. 3B functionally illustrates the ECU 4 regarded as a reception node. The CPU 7 performs a program stored in the memory to provide functions as an identification unit 19 and a restoration unit 20. The memory includes the storage area for the CAN-formatted management table 14.

FIG. 4 illustrates a format of a data frame used for CAN, A data frame 15 is divided into format areas including an arbitration field 16 and a data field 17 to store data. The data frame 15 includes other fields whose description is omitted.

The arbitration field 16 indicates a type and a priority of data and normally stores an 11-bit ID (conforming to an identification number, i.e., CANID). The data field 17 stores data actually transmitted and received and is configured to be up to 64 bits in units of eight bits actually based on the DLC setting. Data is transmitted and received based on CANID, namely, the identification number. The data field 17 is capable of transmitting and receiving data in units of eight bits.

The CAN protocol specifies internal bit information about the data frame 15 based on each CANID. As illustrated in FIG. 5, the management table 14 for CAN is provided for each of the ECUs 3 through 5. An example illustrated in FIG. 5 is described below. In terms of CANID 101, four high-order bits in one byte are specified as available bits, namely, an available area that stores original data (conforming to first data) corresponding to CANID 101. In terms of CANID 101, four low-order bits are specified as empty bits, namely, an empty area.

In terms of CANID 102, six high-order bits in one byte are specified as available bits, namely, an area that stores original data corresponding to CANID 102. Two low-order bits are specified as empty bits. In terms of CANID 103, two high-order bits and three low-order bits in one byte are specified as available bits, namely, an area that stores original data corresponding to CANID 103. Three intermediate-order bits are specified as empty bits. In the description below, frames to which CANIDs 101 through 103 are assigned are referred to as frames 101 through 103, respectively.

The present embodiment is characterized by specifying other data (conforming to second data) α as an empty bit, namely, the empty bit in the frames 101 through 103. FIG. 6 illustrates an example of other data α. The example provides other data α in nine bits, but the amount of information is not limited thereto. The description below explains a mode of process in which the microcomputer 10 of the ECU 3 assigns data α to empty bits in the frames 101 through 103 and the microcomputer 10 of the ECU 4 restores data α assigned to the empty bits while a related art transmits the 9-bit data α as a data frame 104. According to the management table 14 in FIG. 5, bits α8 through α0 of other data α are allocated to the empty bits in the frames 101 through 103, respectively. In terms of the CANID 101, for example, four high-order bits α8 through α5 are allocated to the four low-order empty bits. In terms of the CANID 102, two intermediate-order bits α4 and α3 are allocated to the two low-order empty bits. In terms of the CANID 103, three low-order bits α2 through α0 are allocated to the three intermediate-order empty bits. The ECUs 3 through 5 maintain the management table 14 for CAN to establish communication rules of the network 2.

Figure 8:
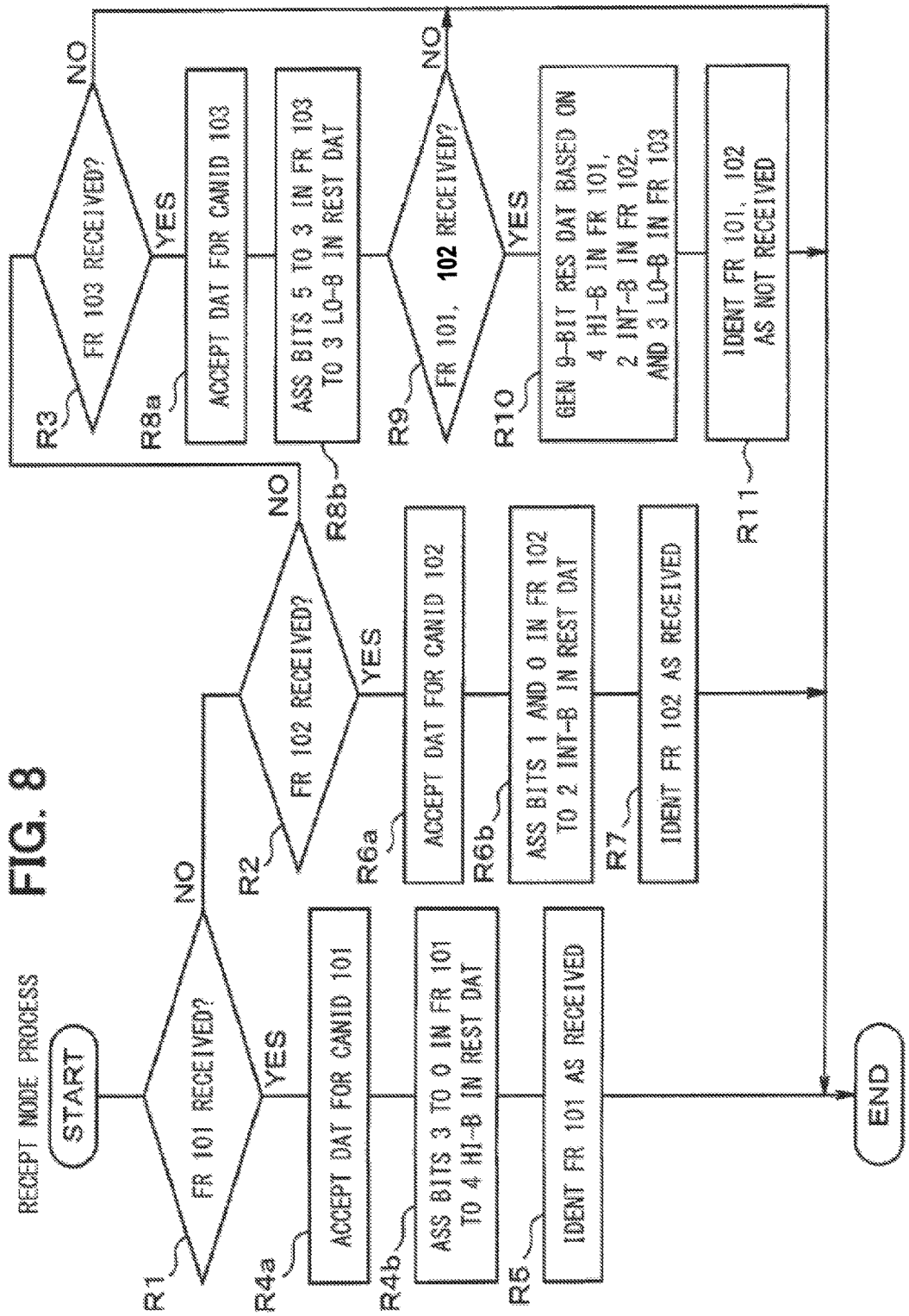
FIG. 8 is a flowchart schematically illustrating a process for the reception node.

In the description below, the ECU 3 at the transmission side is assumed to be a transmission node for data frames and the ECU 4 at the reception side is assumed to be a reception node for data frames. FIG. 7 illustrates a transmission process of the ECU 3 at the transmission side, namely, the transmission node. FIG. 8 illustrates a reception process of the ECU 4 at the reception side, namely, the reception node.

As illustrated in FIG. 7, the microcomputer 10 of the ECU 3 generates the frames 101 through 103 at T1. The microcomputer references the management table 14 and assigns data to "available" bits in the frames 101 through 103 in the management table 14 to generate the frames 101 through 103.

At T2, the microcomputer 10 of the ECU 3 determines whether an update cycle time for the name 104 has elapsed. The microcomputer 10 of the ECU 3 determines that T2 results in NO if the update cycle time does not elapse. The process increments an update cycle counter at T3 and transmits the frames 101 through 103 at T4.

The microcomputer 10 of the ECU 3 determines that T2 results in YES if the update cycle time for the frame 104 elapses at T2. The process updates data for the frame 104 at T5. The process acquires another 9-bit data α as the frame 104 illustrated in FIG. 6, The microcomputer 10 of the ECU 3 then references the management table 14 and assigns data to the empty bits in the management table 14 at T6 through T8. For example, the microcomputer 10 of the ECU 3 assigns four high-order bits in the frame 104 to four empty bits in the frame 101 at T6. For example, the microcomputer 10 of the ECU 3 assigns two intermediate-order bits in the frame 104 to two empty bits in the frame 102 at T7.

For example, the microcomputer 10 of the ECU 3 assigns three low-order bits in the frame 104 to three empty bits in the frame 103 at T8. The microcomputer 10 of the ECU 3 clears the update cycle counter for the frame 104 at T9. The microcomputer 10 of the ECU 3 outputs and thereby transmits the frames 101 through 103 to the network 2 at T4. This can transmit other data α without outputting other data α as the frame 104 to the network 2.

As illustrated in FIG. 8, the microcomputer 10 of the ECU 4 as a reception node waits to receive the frames 101 through 103 from the network 2 at R1 through R3. The microcomputer 10 of the ECU 4 determines that R1 results in YES if the frame 101 is received. The microcomputer 10 references the management table 14 and accepts the available bits in the frame 101 as data corresponding to the CANID 101 at R4a. At R4b, the microcomputer 10 assigns four low-order bits in the data field of the frame 101; namely bits 3 through 0, to four high-order bits in the storage area for restoration data αZ. The original data corresponding to the CANID 101 can be distinguished from split data 08 through α5 of other data α in the reception frame 101. At R5, the microcomputer 10 of the ECU 4 turns on a flag indicating that the frame 101 is already received.

The microcomputer 10 determines that R2 results in YES if the frame 102 is received, The microcomputer 10 references the management table 14 and accepts the available bits in the frame 102 as data corresponding to the CANID 102 at R6a, At R6b, the microcomputer 10 assigns two low-order bits in the data field of the frame 102, namely, bits 1 and 0, to two intermediate-order bits in the storage area for restoration data αZ. The original data corresponding to the CANID 102 can be distinguished from split data α4 and α3 of other data α in the reception frame 102. At R7, the microcomputer 10 of the ECU 4 turns on a flag indicating that the fame 102 is already received.

The microcomputer 10 determines that R3 results in YES if the frame 103 is received. The microcomputer 10 references the management table 14 and accepts the available bits in the frame 103 as data corresponding to the CANID 103 at R8a. At R8b, the microcomputer 10 assigns three intermediate-order bits in the data field of the frame 103, namely, bits 5 through 3, to three low-order bits in the storage area for restoration data αZ. The original data corresponding to the CANID 103 can be distinguished from split data α2 through α0 of other data α in the reception frame 103. After performing the process at R8a and R8b, the microcomputer 10 of the ECU 4 determines at R9 whether the frames 101 and 102 are all received. At R10, the microcomputer 10 generates restoration data αZ only if all the frames 101 and 102 are received.

At R9, the microcomputer 10 determines that R9 results in NO if all the frames 101 and 102 are not received. The microcomputer 10 further awaits the frames 101 through 103. When receiving the frame 103 at R3, the microcomputer 10 determines whether all the frames 101 and 102 are received. At R10, the microcomputer 10 generates restoration data αZ if the frames 101 sod 102 are all received.

At R10, the microcomputer 10 of the ECU 4 generates restoration data αZ by synthesizing the four high-order bits received in the frame 101, the two intermediate-order bits received in the frame 102, and the three low-order bits received in the frame 103. The microcomputer 10 of the ECU 4 nullifies the received data in the frames 101 and 102 and clears the flags that are turned on at R5 and R7 to indicate the completion of reception. Restoration data αZ can thereby be generated.

Figure 9:
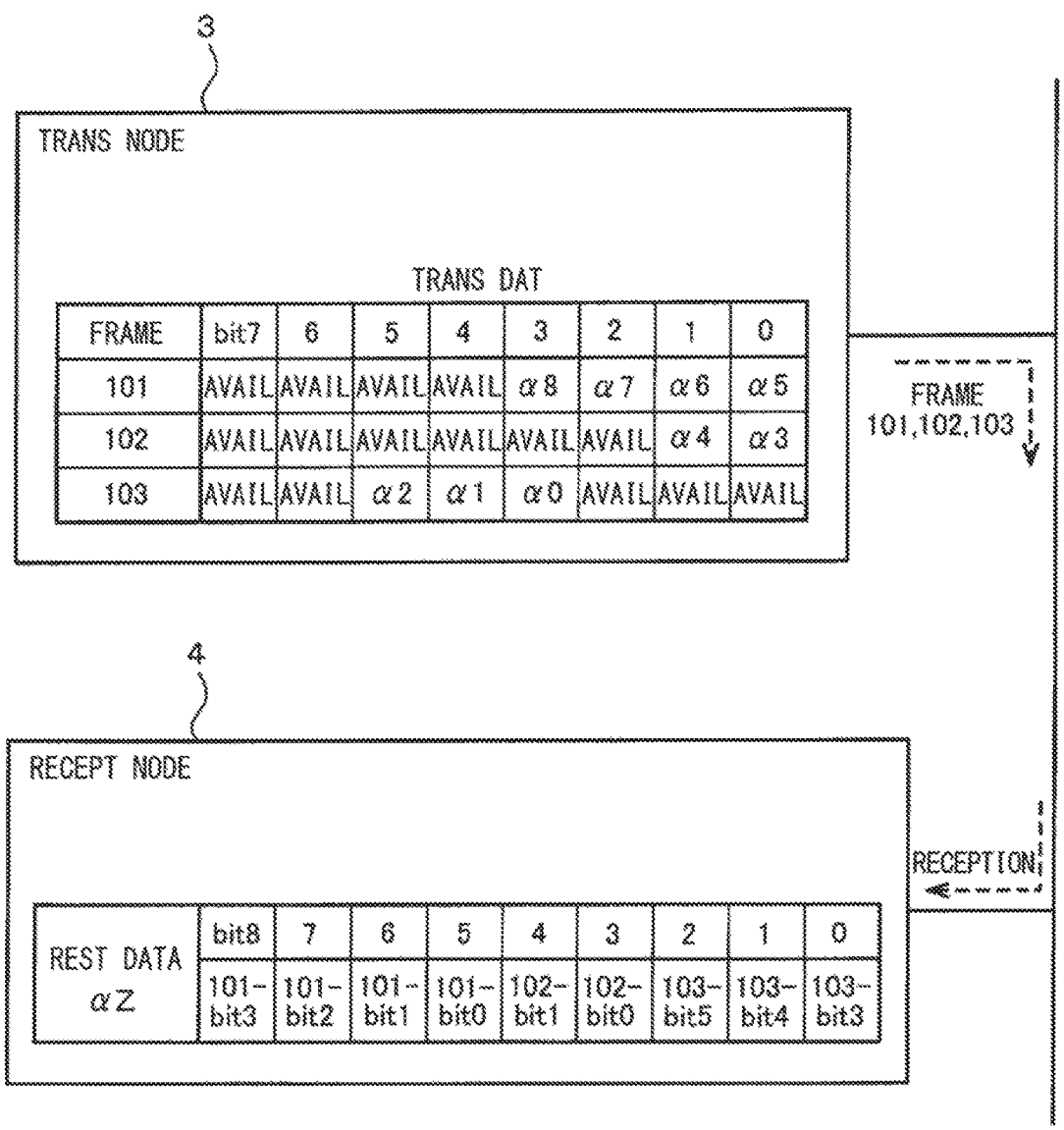
FIG. 9 is a diagram schematically illustrating an image of transmission and reception process.

FIG. 9 illustrates an image of transmission and reception process. As illustrated in FIG. 9, the ECU 3 outputs the frames 101 through 103 as transmission femes to the network 2. The ECU 4 receives all the frames 101 through 103 as reception frames. As above, the empty bits in the frames 101 through 103 are predetermined in the management table 14 so as to correspond to the bits in data α. The microcomputer 10 of the ECU 3 at the transmission side references the management table 14 and can thereby estimate to which empty bits bit data α8 through α0 in other data α should be assigned. The microcomputer 10 of the ECU 4 at the reception side references the management table 14 and can determine to which empty bits bit data α8 through α0 in other data α is assigned. Restoration data αZ can thereby be generated as illustrated in FIG. 10. The result is to eliminate the need to output data α as the different frame 104 to the network 2. The bus load can therefore be reduced.

For example, suppose the unauthorized instrument 6 is connected to the network 2 as illustrated in FIG. 1. A malicious third party is supposed to illegally connect the unauthorized instrument 6. The unauthorized instrument 6, if connected to the network 2, cars read data frames flowing through the network 2. However, the unauthorized instrument 6 can hardly determine which bit in the data field is true data even if the unauthorized instrument 6 receives a data frame. For example, suppose the unauthorized instrument 6 reads a data field in the frame 101. The data field includes split data α8 through α5 that need to be read while synthesized with the data in the frame 101. These data can be assumed to be original data. The unauthorized instrument 6 recognizes split data α8 through α5 in other data α as part of data in the frame 101. This can increase the possibility of incorrectly recognizing the length of data. The same applies to the other frames 102 and 103.

The description below conceptually outlines the features of the present embodiment. The microcomputer 10 of the ECU 3 separately allocates other data α to the empty bits except areas to which the original data in the transmission frames 101 through 103 is allocated. The microcomputer 10 transmits the original data and the allocated split data α8 through α5, α4 and α3, and α2 through α0 as the transmission frames 101 through 103, respectively. The result is to be able to use the empty bits in the transmission frames 101 through 103 configured in the predetermined format, eliminate an unnecessary increase in the amount of communication information, and reduce the bus load. It is possible to prevent an increase in the amount of communication on the The unauthorized instrument 6 may be connected to the network 2 and read data flowing through the network 2. In such a case, the unauthorized instrument 6 coincidently reads data in one transmission frame (e.g., 101) and part of data α, namely split data α8 through α5 in the other frame 104. The unauthorized instrument 6 hardly analyzes which is normal data, and cannot easily analyze data.

The microcomputer 10 of the ECU 4 at the reception side distinguishes the original data from split data α8 through α5, α4 and α3, and α2 through α0 in other data α from the reception frames 101 through 103, for example. The microcomputer 10 generates restoration data αZ from split data α8 through α5, α4 and α3, and α2 through α0 based on allocation destination information. It is therefore possible to restore other data α transmitted from the ECU 3 at the transmission side.

The ECU 3 and the ECU 4 share the management table 14. The management table 14 includes a predetermined set of the information about available bits and empty bits in the frames 101 through 103 and the allocation destination information about other data α corresponding to each CANID, namely, each identification number. The microcomputer 10 of the ECU 4 at the reception side can therefore identify bit data (e.g., α8 through α5) stored in the empty bits as split data α8 through α5 resulting from splitting other data α. The microcomputer 10 can restore the bit data stored in the empty bits as split data α8 through α5 in other data α.

As described in the present embodiment it is favorable to allocate split data α8 through α5, α4 and α3, α2 through α0 each including one bit or more to the transmission frames 101 through 103. It is favorable to allocate split, data α8 through α5, α4 and α3, α2 through α0 resulting from splitting other data α to die empty bits in a plurality of the transmission frames 101 through 103.

(Second Embodiment)

Figure 12:
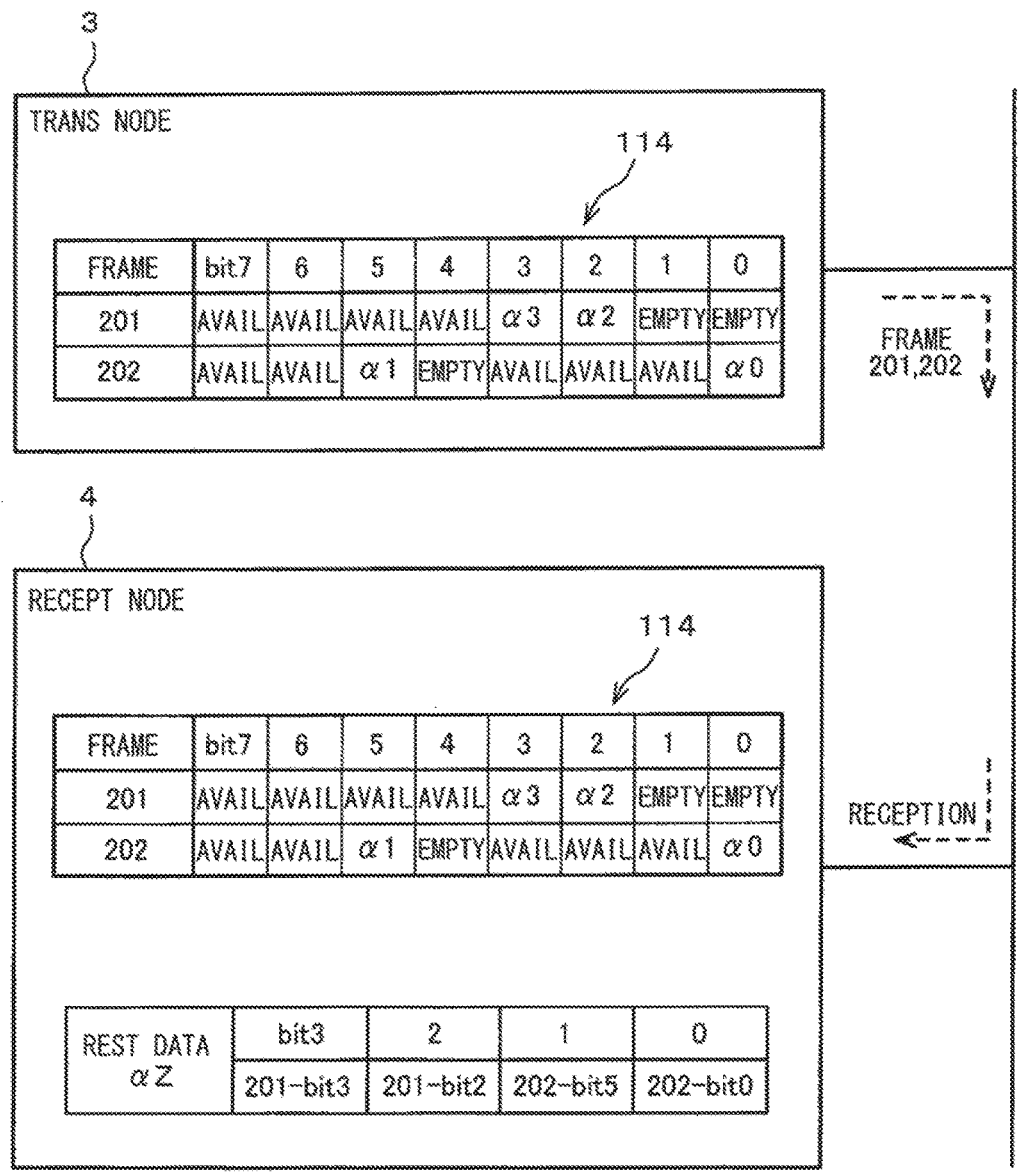
FIG. 12 is a diagram schematically illustrating an image of transmission and reception process.

FIGS. 11 through 13 are additional explanatory diagrams according to the second embodiment. The second embodiment is characterized in that other data α is separately allocated in one transmission frame when one transmission frame includes a plurality of empty bits apart.

FIG. 11 illustrates an example of other data α that is transmitted separately from frames 201 and 202. Other data α is provided as four bits, for example. The present embodiment explains a mode of process in which the ECU 4 restores 4-bit data α that can be transmitted as a data frame 203 by the ECU 3 according to the related art.

FIG. 12 illustrates the contents of a management table 114 shared by the ECUs 3 and 4 and an image of a transmission and reception process as well. As illustrated in FIG. 12, the management table 114 stores allocation of bits α3 and α2 of other data α to two high-order bits of four bits used for all empty bits in one frame 201. The management table 114 also stores allocation of bits α1 and α0 of other data α to part of three bits used for all empty bits in one frame 202. Namely, one frame 202 includes a plurality of empty bits apart. Bits α3, α2, α1, and α0 of other data α are allocated apart in the frame 202. FIG. 12 indicates, "empty," signifying that the empty bit is unchanged even if other data α is placed.

As illustrated in FIG. 12, the ECU 3 outputs the frames 201 and 202 as transmission frames to the network 2. The ECU 4 receives all the frames 201 and 202 as reception frames.

The microcomputer 10 of the ECU 4 as a reception node accepts available bits as data for each CANID, references the management table 114, and assigns two intermediate-order bits, namely, bits 3 and 2 in the data field of the frame 201 to two high-order bits in the storage area of restoration data αZ. The microcomputer 10 of the ECU 4 assigns one intermediate-order bit, namely, bit 5 in the data field of the frame 202 to intermediate-order bit 1 in the storage area of restoration data αZ. Similarly the microcomputer 10 assigns one low-order bit, namely bit 0 in the data field of the frame 202 to low-order bit 0 in the storage area of restoration data αZ. As illustrated in FIG. 13, the microcomputer 10 of the ECU 4 can restore other data α as restoration data αZ.

As described in the present embodiment, other data α is split into bit data α1 and α0 that are then allocated apart in the transmission frame 202 when one transmission frame 202 includes a plurality of consecutive empty bits. It is therefore possible to decrease data to be transmitted and received as consecutive bits compared to the above-mentioned embodiment and enhance the security compared to the above-mentioned embodiment.

(Third Embodiment)

FIGS. 14 through 18 are additional explanatory diagrams according to the third embodiment. The third embodiment is characterized in that an allocation unit allocates a serial number to one transmission frame and separately allocates second data to empty bits specified for the serial number and a transmission unit transmits, more than once, one transmission frame whose serial number is changed.

FIG. 14 illustrates an example of a management table 314. The management table 314 indicates internal bit information when CANID is 301. As illustrated in FIG. 14, four high-order bits are predetermined as available bits in a frame 301. Two subsequent low-order bite 3 and 2 are allocated as an area to configure a serial number. Another two subsequent low-order bits 1 and 0 are specified as an area to allocate another bit β corresponding to the serial number. Suppose the serial number is 00, for example. Two high-order bits β2 and β1 of another bit β are then allocated to two low-order bits 1 and 0, Suppose the serial number is 01, for example. An empty bit and one low-order bit β0 of another bit are then allocated to two low-order bits 1 and 0. The ECUs 3 through 5 share the management table 314 that stores the above-mentioned information.

FIG. 15 illustrates an example of other data β. Other data β provides three bits as the amount of information, for example. The description below explains a mode of process in which 3-bit other data β is assigned to empty bits in the frame 301 and the ECU 4 restores other data β while the ECU 3 transmits 3-bit other data β as a data frame 302 according to the related art.

Figure 16:
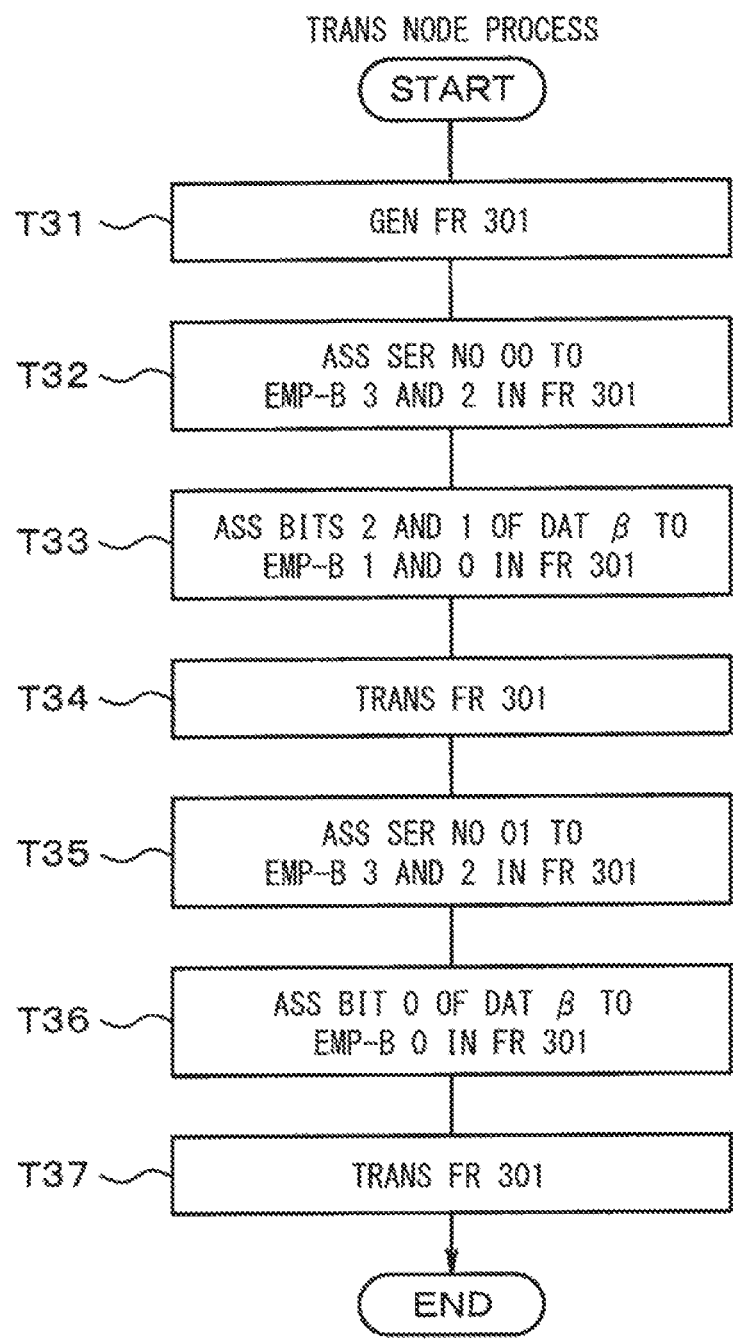
FIG. 16 is a flowchart schematically illustrating a process for the transmission node.
Figure 17:
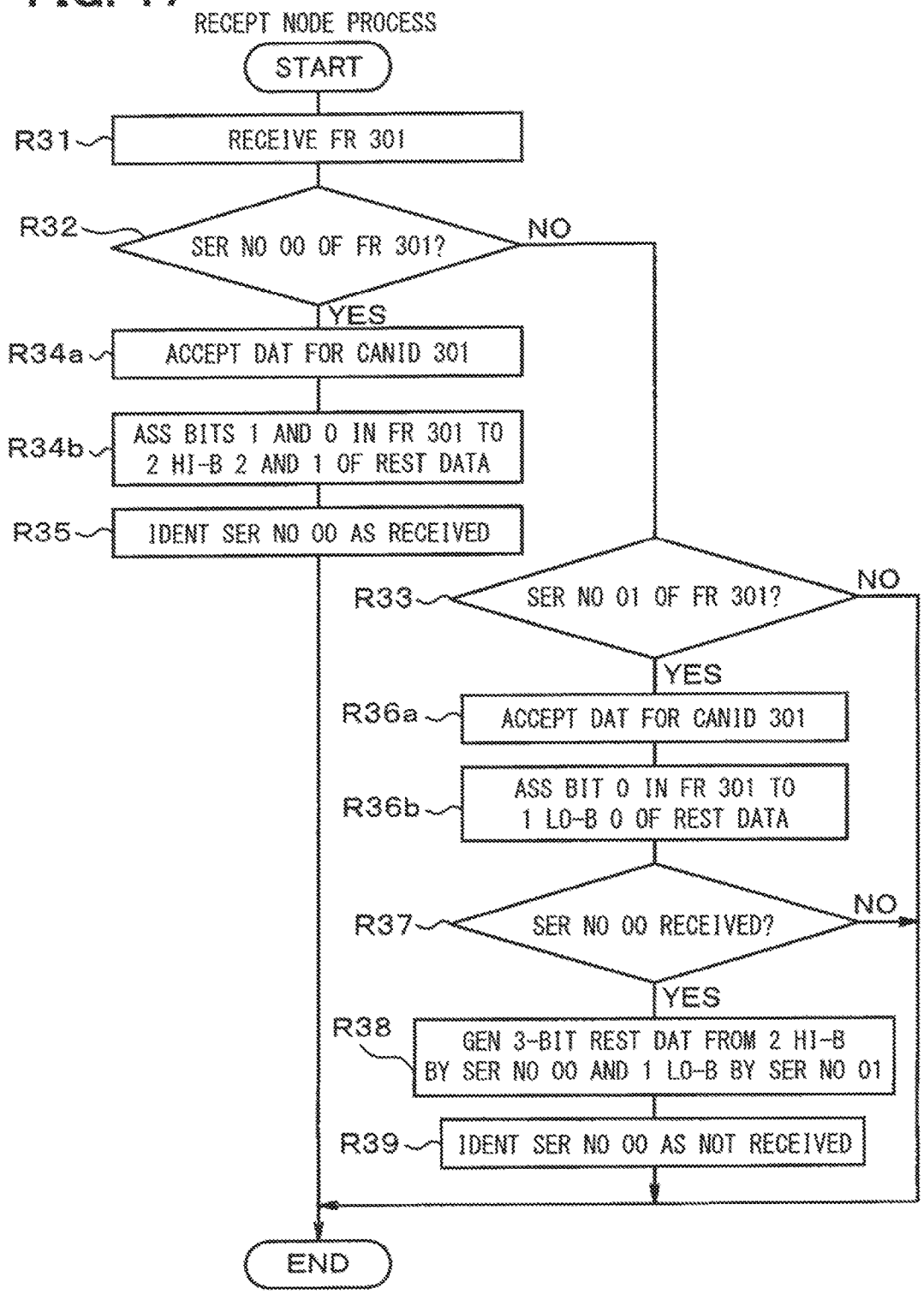
FIG. 17 is a flowchart schematically illustrating a process for the reception node.

FIG. 16 illustrates a transmission process of the ECU 3 at the transmission side. FIG. 17 illustrates a reception process of the ECU 4 at the reception side. As illustrated in FIG. 16, the microcomputer 10 of the ECU 3 generates the frame 301 at T31. The microcomputer 10 of the ECU 3 here references the management table 314 and generates the frame 301 by assigning data to bits 7 through 4 in the data field 17. Bits 7 through 4 are defined as "available" in the management table 314.

At T32, the microcomputer 10 of the ECU 3 assigns No. 00 indicating a serial number to bits 3 and 2 as serial number setup bits, respectively, in the frame 301. At T33, the microcomputer 10 assigns bits 2 and 1 of other data β to empty bits 1 and 0 in the frame 301. At 134, the ECU 3 transmits the frame 301.

At T35, the microcomputer 10 of the ECU 3 assigns No. 01 indicating a serial number to bits 3 and 2 as serial number setup bits, respectively, in the frame 301. At T36, the microcomputer 10 assigns low-order bit 0 of other data β to empty bit 0 in the frame 301. At T37, the ECU 3 transmits the frame 301. Namely, the ECU 3 transmits the frame 301 twice by changing the serial number. As illustrated in FIG. 17, the microcomputer 10 of the ECU 4 receives the frame 301 at R31. At R32 and R33, the microcomputer 10 confirms the serial number of the frame 301 and determines whether the serial number is 00 or 01. The microcomputer 10 of the ECU 4 discards the frame 301 if the accepted serial number is neither 00 nor 01.

The microcomputer 10 determines that R32 results in YES if the frame 301 is assigned serial number 00, for example. At R34a, the microcomputer 10 accepts the available bits in the frame 301 as data for CANID 301. At R34b, the microcomputer 10 assigns bits 1 and 0 in the frame 301 to two high-order bits 2 and 1 of restoration data βZ. The microcomputer 10 further turns on a flag that identifies serial number 00 as being received, namely, identifies the frame 301 corresponding to serial number 00 as being received.

The microcomputer 10 determines that R33 results in YES if the frame 301 is assigned serial number 01, for example. At R36a, the microcomputer 10 accepts the available bits in the frame 301 as data for CANID 301. At R36b, the microcomputer 10 assigns bit 0 in the frame 301 to one low-order bit 0 of restoration data βZ. The microcomputer 10 of the ECU 4 determines whether serial number 00 is received. The microcomputer 10 of the ECU 4 determines whether the serial number is received by determining whether the flag is turned on. The microcomputer 10 determines that R37 results in NO if the serial number is not received. The microcomputer 10 exits from the process and repeats the process from R31 until serial number 00 for the frame 301 is received.

The microcomputer 10 of the ECU 4 proceeds to R38 only when serial number 00 is received at R37. At R38, the microcomputer 10 synthesizes two high-order bits received by serial number 00 with one low-order hit received by serial number 01 to generate 3-bit restoration data βZ. At R39, the microcomputer 10 of the ECU 4 identifies serial number 00 as not being received, namely, clears the flag that identifies the frame 301 corresponding to serial number 00 as being received.

Figure 18:
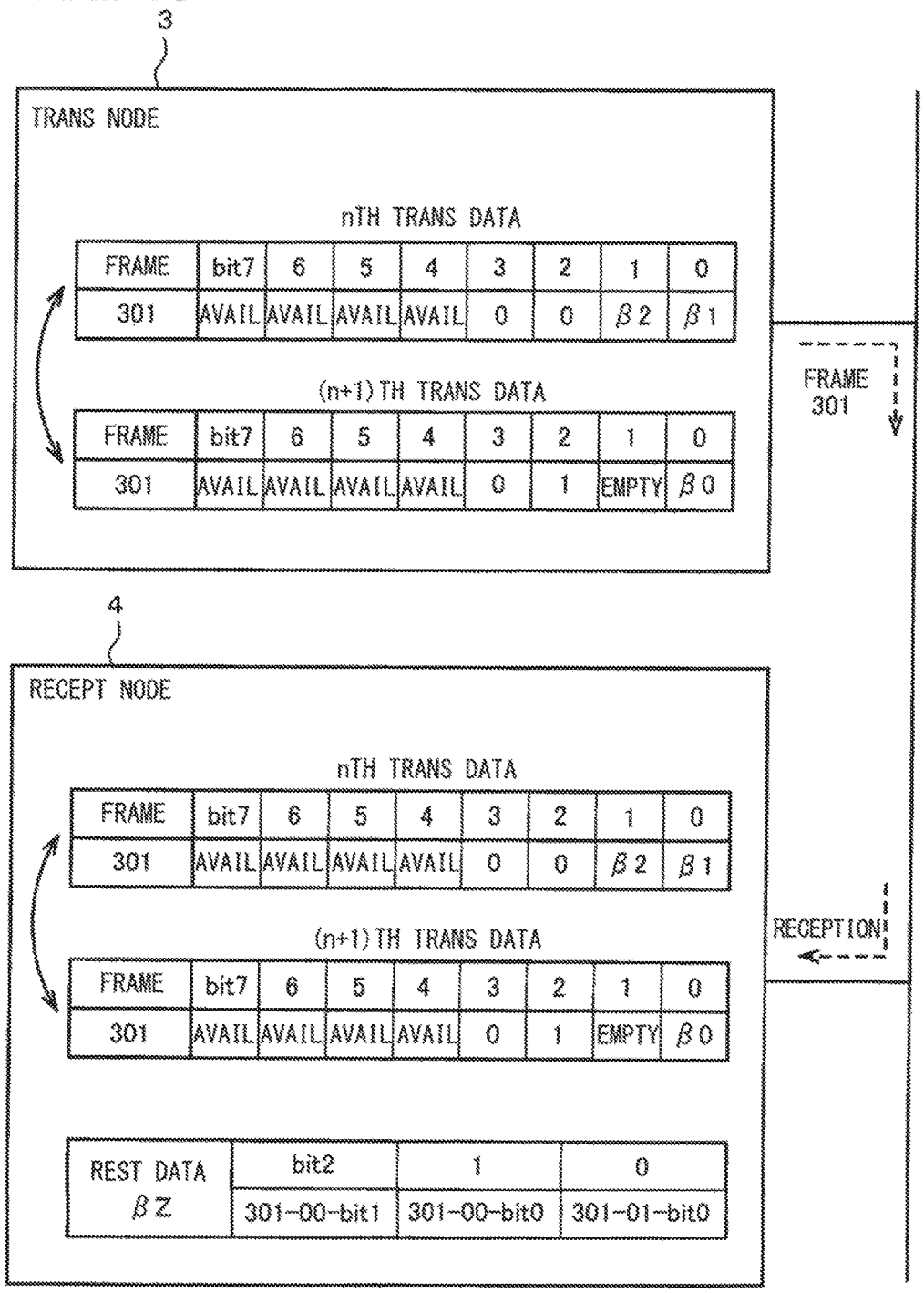
FIG. 18 is a diagram schematically illustrating an image of transmission and reception process.

FIG. 18 illustrates an image of a transmission and reception process. As illustrated in FIG. 18, the ECU 3 successively outputs and transmits frames 301 as transmission frames assigned different serial numbers to the network 2. The ECU 4 receives all the frames 301 as reception frames. Two intermediate-order bits 3 and 2 in the frame 301 indicate a serial number. The management table 314 predetermines two subsequent bits 1 and 0 as data corresponding to the serial number.

The ECU 3 at the transmission side references the management table 314 and can thereby estimate to which empty bits other data β should be assigned. The microcomputer 10 of the ECU 4 at the reception side references the management table 314 and can determine to which empty bits other data β is assigned. The ECU 4 at the reception side references the management table 314 and can restore bit 1 of serial number 00 in the frame 301 as most significant bit 2 and restore bit 0 of serial number 00 in the frame 301 as intermediate-order bit 1. Bit 0 of serial number 01 in the frame 301 can be restored as least significant bit 0.

Restoration data βZ can be generated from other data β as illustrated in FIG. 19. Other data β need not be transmitted as the different frame 302 to the network 2. The bus load can therefore be reduced. It is favorable that the ECU 3 transmits the nth (n≥1) transmission data and then (n+1)th transmission data alternately. The ECU 4 can thereby receive the data alternately.

According to the present embodiment, a serial number is allocated to one transmission frame 301. Other data β is separately allocated to empty bits specified correspondingly to the serial number. One transmission frame 301 is transmitted more than once by changing the serial number of the transmission frame 301. One transmission frame 301 can therefore be used to separately transmit other data β more than once by splitting other data β. The ECU 4 at the reception side receives the transmission frame 301 more than once and can restore restoration data βZ from the split data by referencing the allocation destination information in the management table 314.

While there has been described the mode to separately transmit the frame 301 twice, the frame 301 may be separately transmitted three times or more.

(Fourth Embodiment)

FIGS. 20 through 25 are additional explanatory diagrams according to the fourth embodiment. The first through third embodiments provide the mode that splits one other data α or β and assigns it to empty bits in the data field of the frame. The fourth embodiment provides a mode that splits a plurality of other data α and β and assigns them to empty bits in the data fields of the transmission frames 401 through 404. Particularly, the microcomputer 10 of the ECU 3 at the transmission side is characterized by separately allocating split data from a plurality of other data α and β to empty bits of a plurality of transmission frames 401 through 404.

FIG. 20 illustrates an example of other data α and β. Other data α is provided as 3-bit data and other data β is provided as 7-bit data, for example. The description below explains a mode in which the ECU 3 at the transmission side assigns 3-bit data α and 7-bit data β to empty bits in the frames 401 through 404 and the ECU 4 at the reception side restores data α and β while the ECU 3 transmits 3-bit data α and 7-bit data β as data frames 405 and 406, respectively, according to the related art.

FIG. 21 illustrates an example of a management table 414. The management table 414 stores internal bit information when CANID is set to 401 through 404. As illustrated in FIG. 21, four high-order bits 7 through 4 in the frame 401 is specified as available bits. Two subsequent intermediate-order bits 3 and 2 are allocated as two high-order bits α2 and α1 in other data α. Least significant bit 0 is allocated as least significant bit β0 in other data β.

Six high-order bits 7 through 2 in the frame 402 is specified as available bits. One subsequent intermediate-order bit 1 is allocated as least significant bit α0 in other data α. Least significant bit 0 is allocated as intermediate-order bit β1 in other data β.

Two high-order bits 7 and 6 and three low-order bits 2 through 0 in the frame 403 is specified as available bits. Intermediate-order bits 4 and 3 are allocated as intermediate-order bits β3 and β2 in other data β. Intermediate-order bit 5 in the frame 403 is specified as an empty bit. One high-order bit 7 and four low-order bits 3 through 0 in the frame 404 are specified as available bits. Intermediate-order bits 6 through 4 are allocated as intermediate-order bits β4, β5, and β6 in other data β. The ECUs 3 through 5 share the management table 414 that stores the above-mentioned information.

Figure 22:
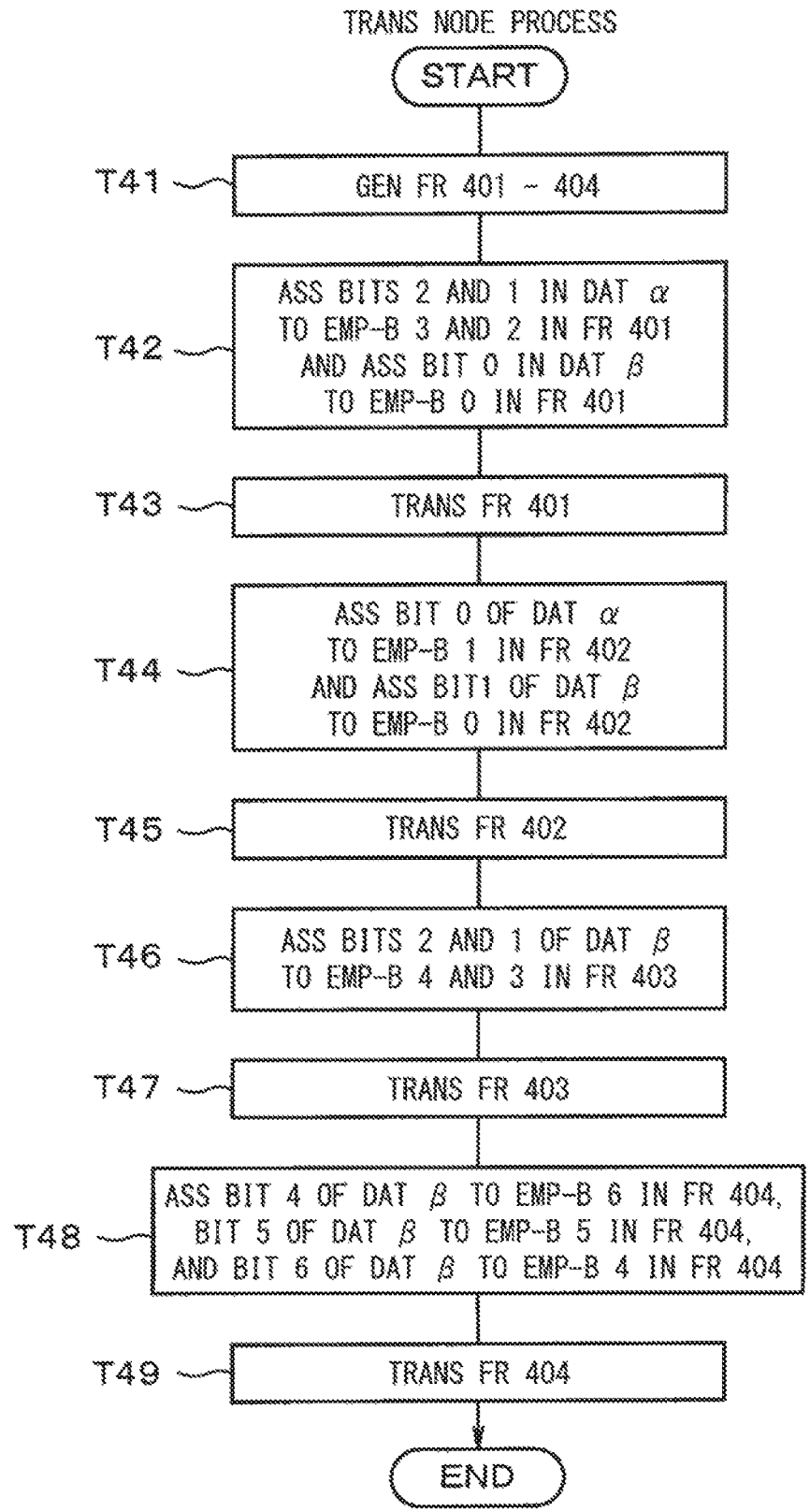
FIG. 22 is a flowchart schematically illustrating a process for the transmission node.
Figure 23:
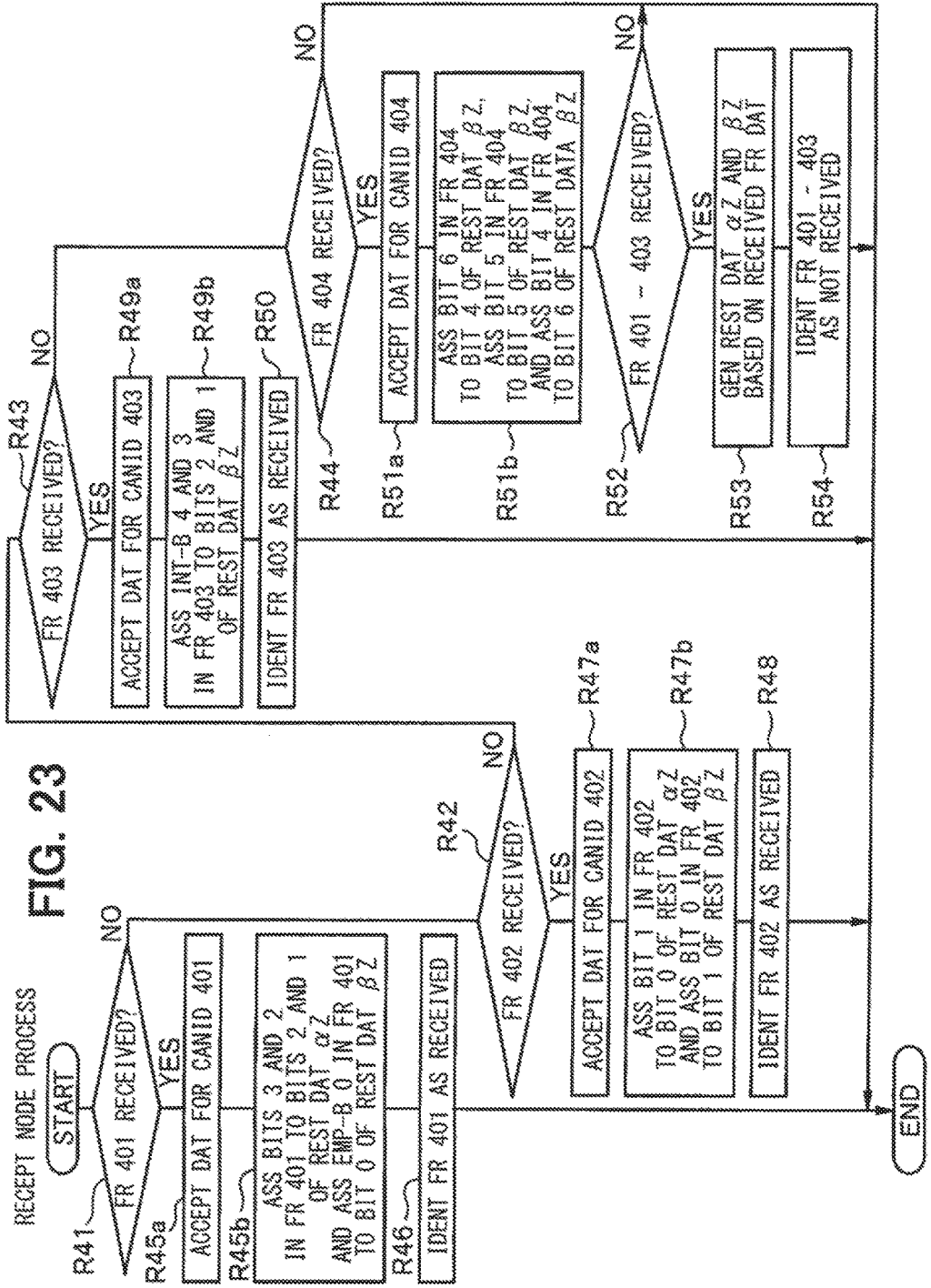
FIG. 23 is a flowchart schematically illustrating a process for the reception node.

FIG. 22 illustrates a transmission process of the ECU 3 at the transmission side. FIG. 23 illustrates a reception process of the ECU 4 at the reception side. As illustrated in FIG. 22, the microcomputer 10 of the ECU 3 generates the frames 401 through 404 at T41. The microcomputer 10 of the ECU 3 references the management table 414 and generates the frames 401 through 404 by assigning data to hits specified as "available" for a data field in the management table 414.

At T42, the microcomputer 10 of the ECU 3 assigns bits 2 and 1 in other data α to empty bits 3 and 2 in the frame 401, respectively and assigns bit 0 in other data β to empty bit 0 in the frame 401. At T43, the microcomputer 10 of the ECU 3 outputs and transmits the frame 401 to the network 2.

At T44, the microcomputer 10 of the ECU 3 assigns bit 0 of other data α to empty bit 1 in the frame 402 and assigns bit 1 of other data β to empty bit 0 in the frame 402. At T45, the microcomputer 10 of the ECU 3 outputs and transmits the frame 402 to the network 2. The microcomputer 10 of the ECU 3 assigns bits 2 and 1 of other data β to empty bits 4 and 3 in the fame 403 at T46 and outputs and transmits the frame 403 to the network 2 at T47.

At T48, the microcomputer 10 of the ECU 3 assigns bit 4 of other data β to empty bit 6 in the frame 404, bit 5 of other data β to empty bit 5 in the frame 404, and bit 6 of other data β to empty bit 4 in the frame 404. At T49, the microcomputer 10 of the ECU 3 outputs and transmits the frame 404 to the network 2.

As illustrated in FIG. 23, the microcomputer 10 of the ECU 4 awaits to receive the frames 401 through 404 at R41 through R44. When receiving the frame 401 at R41, the microcomputer 10 of the ECU 4 references the management table 414, accepts the available bits in the frame 401 as data for the CANID 401 at R45a, and assigns bits 3 and 2 in the data field of the frame 401 to two high-order bits 2 and 1 in the storage area of restoration data αZ at R45b. The original data corresponding to the CANID 401 can be distinguished from split data α2, α1 and β0 of other data α and β in the reception frame 401. At R46, the microcomputer 10 turns on a flag that identifies the frame 401 as being received.

When receiving the frame 402, the microcomputer 10 of the ECU 4 references the management table 414, accepts the available bits in the frame 402 as data for the CANID 402 at R47a, and assigns intermediate-order bit 1 in the data field of the frame 402 to least significant bit 0 of restoration data αZ and assigns least significant bit 0 in the data field of the frame 402 to intermediate-order bit 1 of restoration data βZ at R47b. The original data corresponding to the CANID 402 can be distinguished from split data α0 and β0 of other data α and β in the reception frame 402. At R48, the microcomputer 10 of the ECU 4 turns on a flag that identifies the frame 402 as being received.

When receiving the frame 403, the microcomputer 10 of the ECU 4 references the management table 414, accepts the available bits in the frame 403 as data for the CANID 403 at R49a, and assigns intermediate-order bits 4 and 3 in the data field of the frame 403 to intermediate-order bits 2 and 1 of restoration data βZ at R49b. The original data corresponding to the CANID 403 can be distinguished from spilt data β3 and β2 of other data β in the reception frame 403. At R50, the microcomputer 10 of the ECU 4 turns on a flag that identifies the frame 403 as being received.

When receiving the frame 404, the microcomputer 10 of the ECU 4 references the management table 414, accepts the available bits in the frame 404 as data for the CANID 404 at R51a, and assigns intermediate-order bit 6 in the data field of the frame 404 to intermediate-order bit 4 of restoration data βZ, assigns intermediate-order bit 5 in the data field of the frame 404 to intermediate-order bit 5 of restoration data βZ, and assigns intermediate-order bit 4 in the data field of the frame 404 to intermediate-order bit 6 of restoration data βZ at R51b. The original data corresponding to the CANID 404 can be distinguished from split data β6 through β4 of other data β in the reception frame 404.

After performing the process at R51, the microcomputer 10 of the ECU 4 determines at R52 whether all the frames 401 through 403 are received. At R53, the microcomputer 10 restores data α and β based on the received frame data only if all the frames 401 through 403 are received. The microcomputer 10 synthesizes all the data to generate restoration data αZ and βZ. At R54, the microcomputer 10 of the ECU 4 nullifies received data in the frames 401 through 403, namely, clears the flags that are turned on at R48, R48, and R50 to indicate the completion of reception. Restoration data αZ and βZ can thereby be generated.

Figure 24:
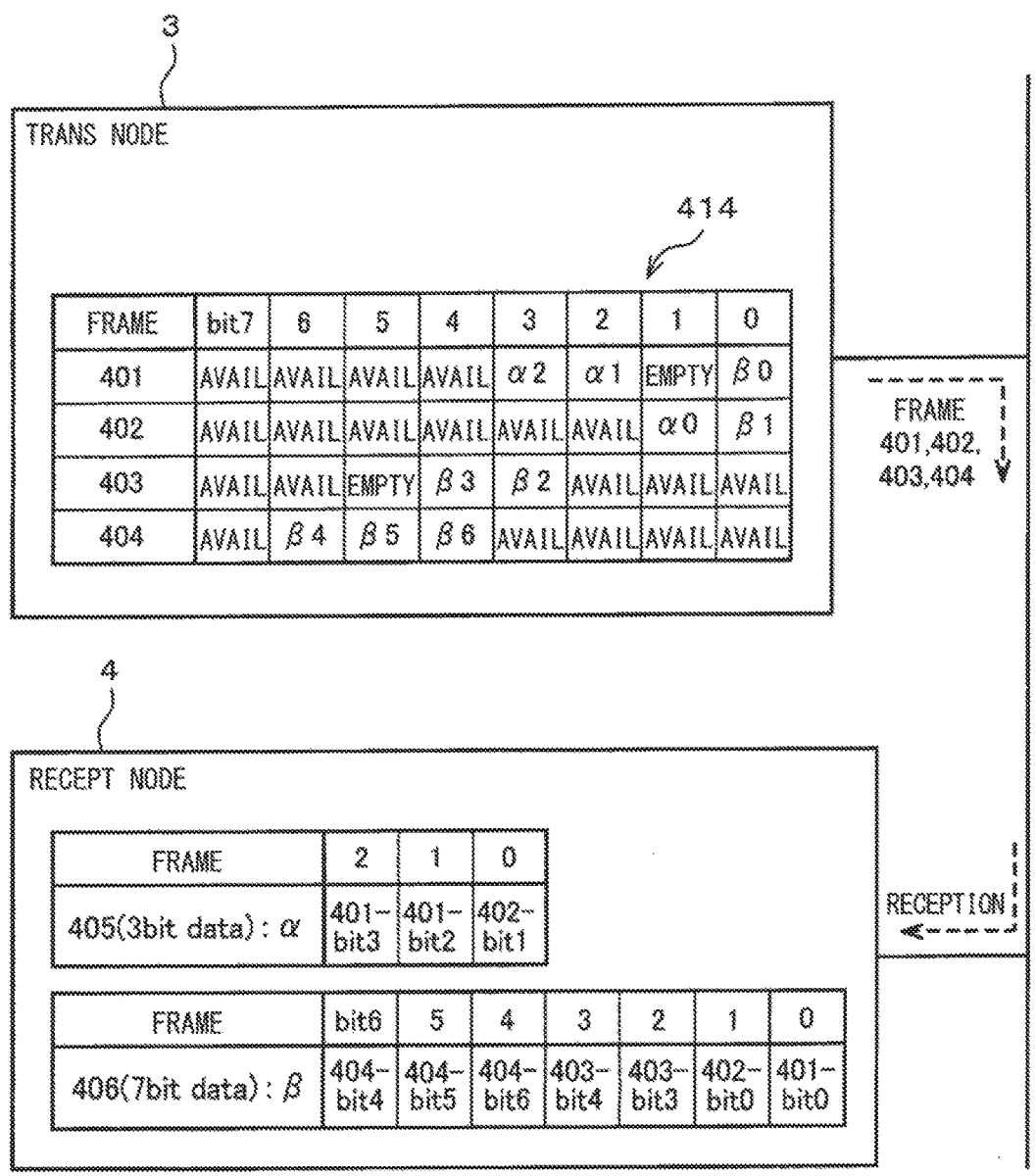
FIG. 24 is a diagram schematically illustrating an image of transmission and reception process.

FIG. 24 illustrates an image of a transmission and reception process. As illustrated in FIG. 24, the ECU 3 outputs the frames 401 through 404 as transmission frames to the network 2 and the ECU 4 receives all the frames 401 through 404 as reception frames. The empty bits in the frames 401 through 404 are predetermined to correspond to bits of data α and β in the management table 414. The microcomputer 10 of the ECU 3 at the transmission side references the management table 414 and can thereby estimate to which empty bits bits in other data α and β should be assigned. The microcomputer 10 of the ECU 4 at the reception side references the management table 414 and can determine to which empty bits other data α and β is assigned. Restoration data αZ and βZ can thereby be generated as illustrated in FIG. 25. Data α and β need not be transmitted as the different frames 405 and 406 to the network 2. The bus load can therefore be reduced.

(Other Embodiments)

The present disclosure is not limited to the above-mentioned embodiments but may be modified differently and is applicable to various embodiments within the spirit and scope of the disclosure. The following modifications or enhancements are available, for example.

According to the first embodiment, for example, the ECU 4 at the reception side confirms the frames 101, 102, and 103 in ascending order that are output to the network 2. The frames may be confirmed in descending order or in any other orders. The same applies to the second and subsequent embodiments. The frames may be confirmed in any order. The above-mentioned embodiments have been described with reference to the corresponding flowcharts. However, the process sequences illustrated in the flowcharts are only examples. The processes need not be performed in the sequences illustrated in the flowcharts. The process sequences may be interchanged and the processes may be changed as needed or may be partially omitted if a purpose equal to or similar to the above-mentioned embodiments is achievable.

The above-mentioned embodiments configure an empty area in units of bits and describe consecutive empty bits as an "empty area." However, the empty area may be configured in units of bytes instead of bits.

The communication controller 11 may be built into the microcomputer 10. The communication controller 11 is not limited to CAN and is applicable to communication systems that use a protocol using a format having an empty area.

There have been described the configurations in which the ECUs 3 through 5 each include and share the management tables 14, 114, 314, and 414, However, the management tables 14, 114, 314, and 414 may be stored in another ECU connected to the network 2 and the ECUs 3 through 5 may reference the management tables 14, 114, 314, and 414 via the network 2.

All or part of the functions performed by the microcomputer 10 of the ECUs 3 through 5 may be configured as hardware by using one or more IC chips. A plurality of the above-mentioned embodiments may be combined. A parenthesized numeral represents an example of correspondence relation to a concrete measure described in the above-mentioned embodiment as one mode of the present disclosure and does not limit the technical scope of the present disclosure. A mode of omitting past of the above-mentioned embodiment can be assumed as an embodiment on condition that the omission is made as long as the issue can be resolved. All conceivable modes can be assumed as an embodiment without departing from the essence of the disclosure identified by wordings.

It is noted that a flowchart or the processing of the flowchart in the present application includes sections (also referred to as steps), each of which is represented, for instance, as T1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An electronic control unit for providing a transmission node in a communication system in which the transmission node stores first data in a transmission frame having a predetermined format and transmits the first data to a network, and a reception node receives the first data as a reception frame via the network, the electronic control unit of the transmission node comprising:
   a memory; and
   a processor, the processor is configured to execute instructions stored in the memory to:
     divide second data into a plurality of split data items, and allocate the split data items to an empty area of the transmission frame other than an area where the first data is allocated; and
     transmit the split data items allocated by the processor and the first data as the transmission frame;
   wherein:
   the processor of the transmission node is configured to allocate an area for a serial number to the transmission frame,
     wherein the area for the serial number is configured with serial number setup bits in the empty area, into which the split data items are allocated, of the transmission frame,
     wherein the serial number indicates a transmission frame;
   the processor of the transmission node is further configured to transmit the transmission frame with the first data and the split data items a plurality of times including to:
     change the serial number in a subsequent transmission frame which has the same first data and the same split data items; and
     transmit the subsequent transmission frame having the changed serial number with the same first data and the same split data items.

2. The electronic control unit according to claim 1, wherein:
   the first data provides an identification number of the transmission frame;
   (i) the empty area of the transmission frame and (ii)an allocation destination of each split data item are preliminarily determined by the identification number; and
   the transmission node and the reception node commonly include a management table for providing information about the empty area in the transmission frame and information about allocation destinations of the first data and the split data items of the second data.

3. The electronic control unit according to claim 1, wherein:
   the second data includes a plurality of bits; and
   the processor is further configured to allocate the split data items, each of which includes at least one bit, to the empty area in the transmission frame.

4. The electronic control unit according to claim 1, wherein:
   when the transmission frame includes a plurality of empty areas arranged apart from each other, the processor is further configured to allocate the split data items to the empty areas separately.

5. The electronic control unit according to claim 1, wherein:
   the processor is further configured to transmit a plurality of transmission frames;
   each of the plurality of transmission frames includes an empty area; and
   the processor is further configured to allocate the split data items to the empty area of each transmission frame, respectively.

6. The electronic control unit according to claim 1, wherein:
   the processor is further configured to divide a plurality of second data into a plurality of split data items;
   the processor is further configured to transmit a plurality of transmission frames; and
   the processor is further configured to allocate the split data items of each second data to the empty area of each transmission frame.

7. An electronic control unit for providing a reception node in a communication system in which a transmission node stores first data in a transmission frame having a predetermined format and transmits the first data to a network, and the reception node receives the first data as a reception frame via the network, the electronic control unit of the reception node comprising:
   a memory; and
   a processor, the processor is configured to execute instructions stored in the memory to;
     distinguish the first data from split data items of second data in the reception frame, wherein the split data items are allocated to an empty area of the transmission frame other than where the first data is allocated,
     wherein an area for the serial number is configured with serial number setup bits in the empty area, into which the split data items are allocated, of the transmission frame,
     wherein the serial number indicates a transmission frame; and
     generate restoration data from the split data items based on allocation destination information.

8. The electronic control unit according to claim 7, wherein:
   the first data provides an identification number of the transmission frame;
   (i) the empty area of the transmission frame and (ii) an allocation destination of each split data item are preliminarily determined by the identification number; and
   the transmission node and the reception node commonly include a management table for providing information about the empty area in the transmission frame and information about allocation destinations of the first data and the split data items of the second data.

9. The electronic control unit according to claim 7, wherein:
   the second data includes a plurality of bits; and
   the split data items, each of which includes at least one bit, are allocated to the empty area in the transmission frame.

10. The electronic control unit according to claim 7, wherein:
- when the transmission frame includes a plurality of empty areas arranged apart from each other, the split data items are allocated to the empty areas separately.

11. The electronic control unit according to claim 7, wherein:
- the processor of the reception node is further configured to receive a plurality of transmission frames;
- each of the plurality of transmission frames includes an empty area; and
- the split data items are allocated to the empty area of transmission frame, respectively.

12. The electronic control unit according to claim 7, wherein:
- a plurality of second data are divided into a plurality of split data items;
- the processor of the reception node is further configured to receive a plurality of transmission frames; and
- the split data items of each second data are allocated to the empty area of each transmission frame.

\* \* \* \* \*